Dec. 19, 1967   S. A. DE CARO ETAL   3,358,485
MEASURING AND CONTROLLING GAP BETWEEN ROLLS
Filed Feb. 15, 1965
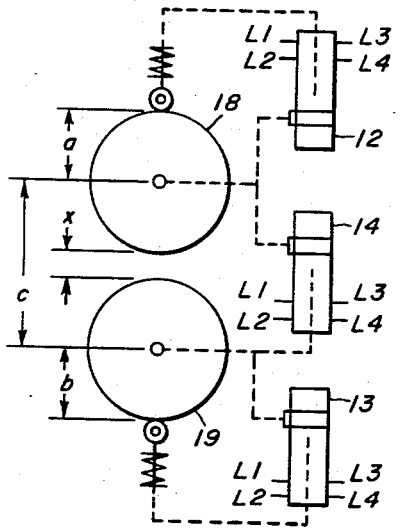
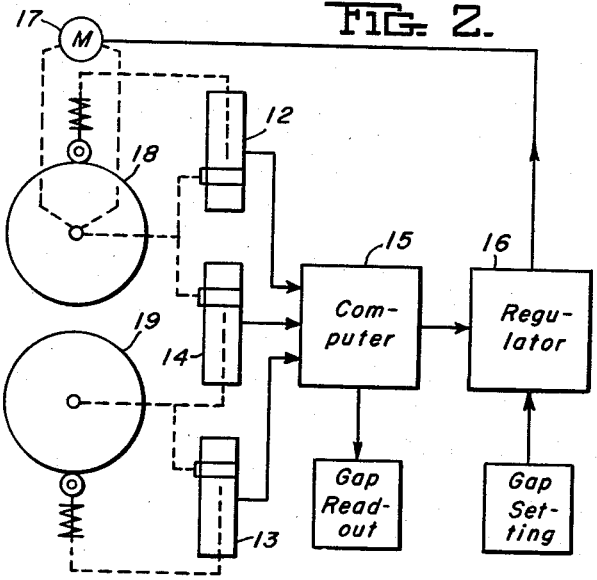
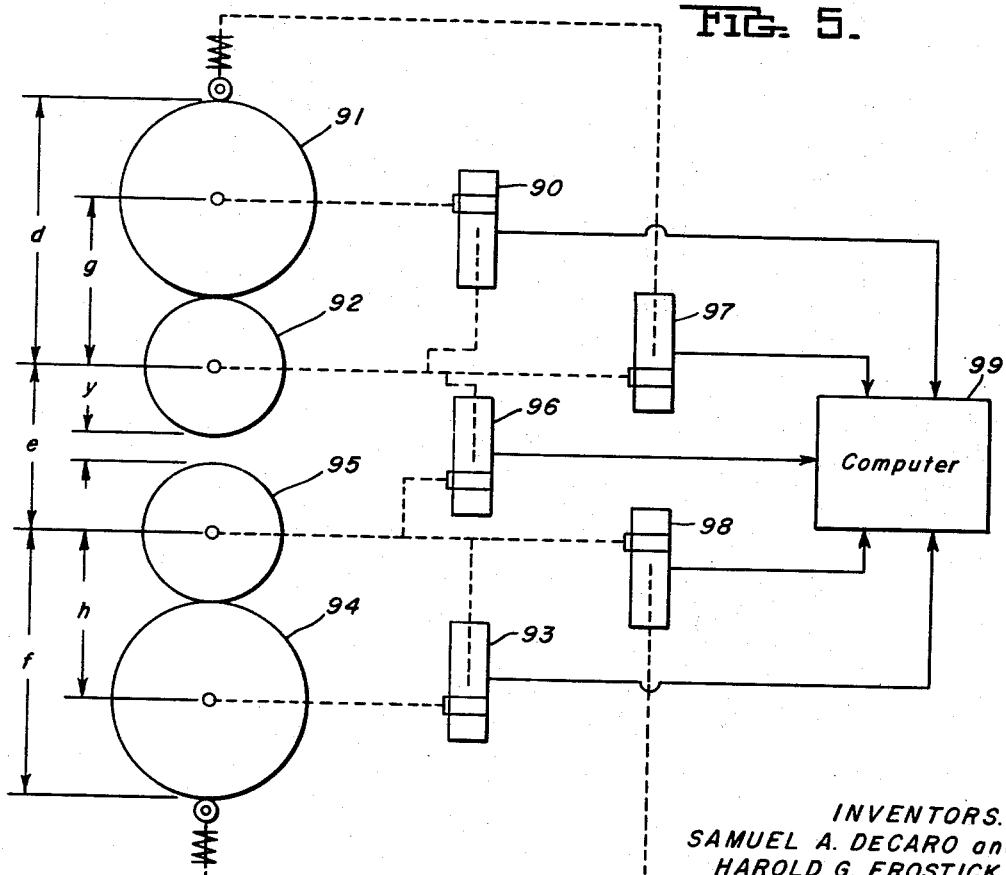
INVENTORS.
SAMUEL A. DECARO and
HAROLD G. FROSTICK
By Donald G. Dalton
Attorney

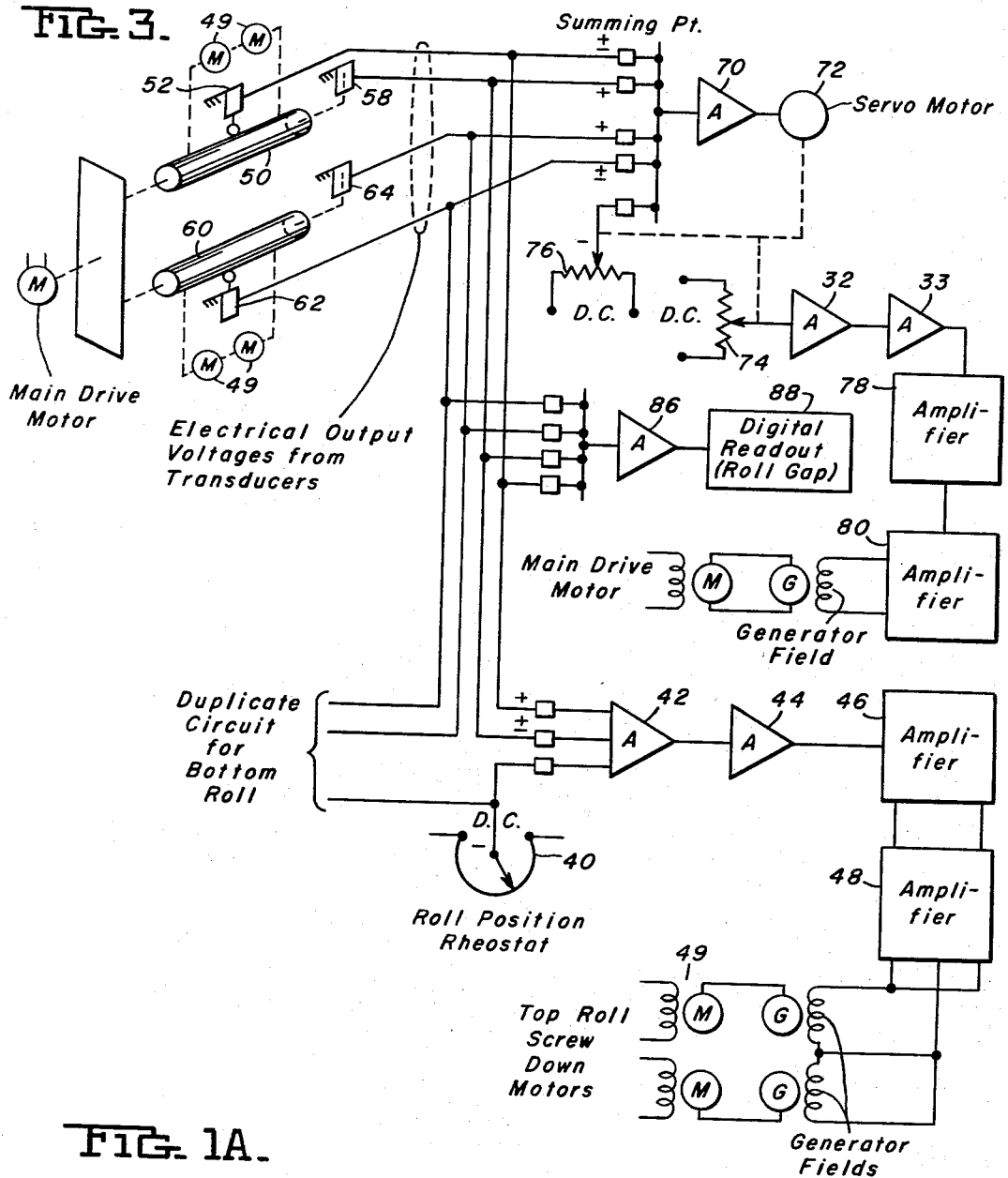
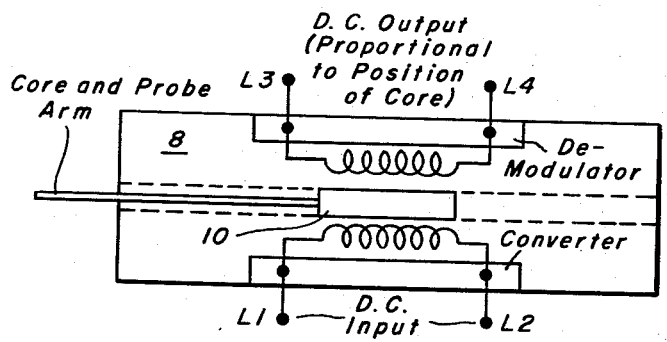

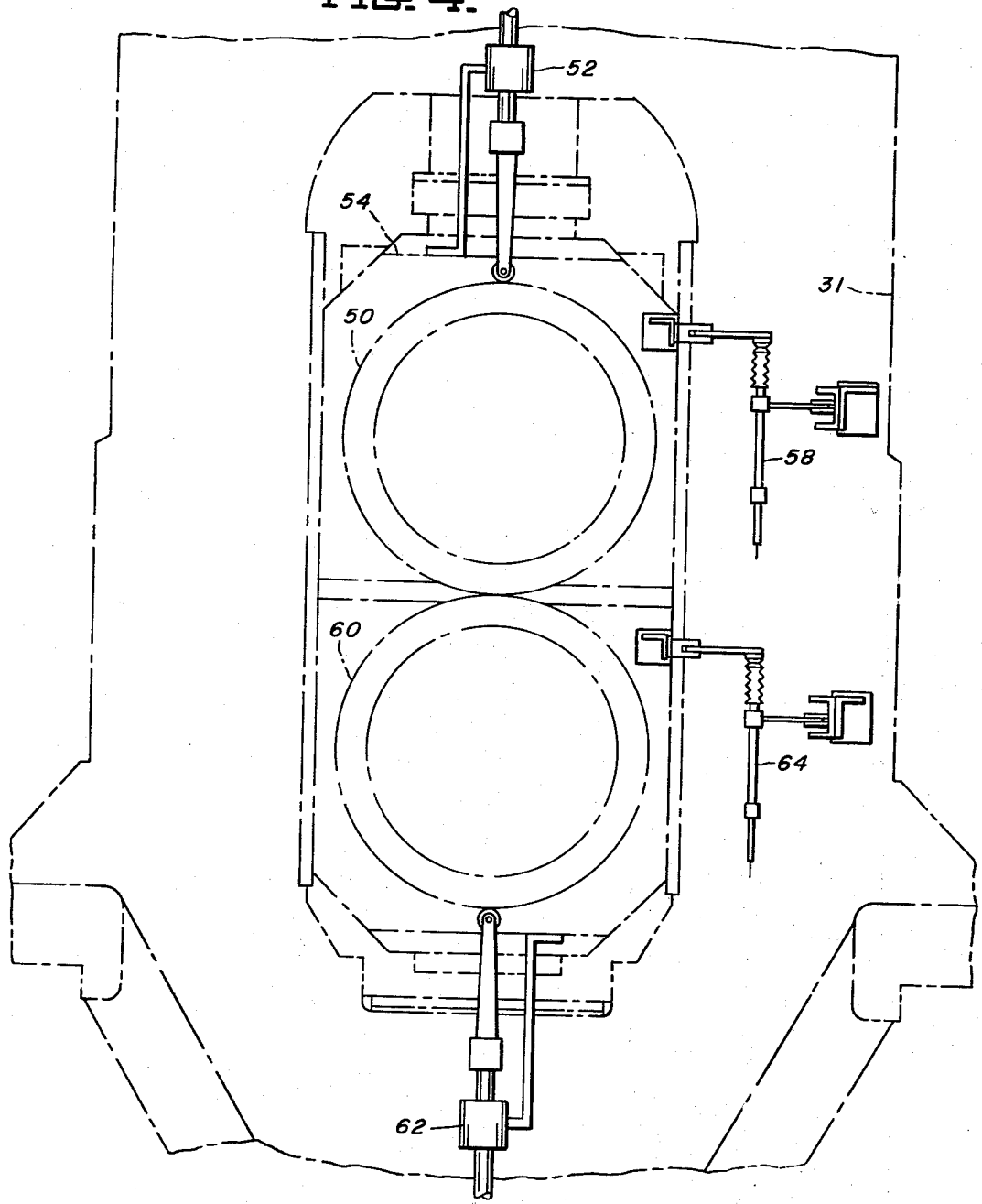

United States Patent Office 3,358,485
Patented Dec. 19, 1967

3,358,485
MEASURING AND CONTROLLING GAP BETWEEN ROLLS
Samuel A. De Caro, Berwyn, and Harold G. Frostick, Oak Lawn, Ill., assignors to United States Steel Corporation, a corporation of Delaware
Filed Feb. 15, 1965, Ser. No. 432,616
10 Claims. (Cl. 72—21)

ABSTRACT OF THE DISCLOSURE

A method and apparatus for measuring and controlling the gap between upper and lower rolls in a rolling mill by obtaining signals proportional to the distances sought to be measured and then algebraically summarizing the signals to produce a resultant signal proportional to the roll gap. The resultant signal may be used to provide roll adjustment and control for a predetermined roll spacing.

---

This invention relates to a system for measuring and controlling the gap, i.e. spacing, between the rolls in rolling mills. In addition, the invention includes a method and system for controlling the rotational speed of the rolls in accordance with the gap between the rolls. The invention is particularly useful for measuring and controlling roll gap or roll spacing during rolling when the rolls are subjected to wear, deflection and flattening and when the mill housing is subjected to the stresses of rolling forces.

A practical system has long been sought to control the gap between the rolls in a mill in order to compensate for the forces developed during rolling which tend to disturb the positions of the rolls and, thereby, affect the thickness of the product. The present invention provides a unique and highly effective arrangement to accomplish the automatic positioning of rolls in mills in response to measurements of changes in the rolling mill resulting from the varying rolling forces imposed on the mill by the product being rolled.

Work rolls in the mill are mounted in housings constructed to withstand the forces developed during rolling. In the usual situation, a roll is mounted in bearings and in chucks, which in turn, are supported by housings. The chucks and rolls are slidable within the housings to permit controlled movement of the rolls with respect to each other. Uncontrolled movement of the rolls or variation in roll gap can be caused by wearing or flattening of the roll surfaces during use, deflection of the rolls during rolling, influence of strains developed in the mill housing by the rolling forces caused by the variation in resistance to deformation of the material between the rolls and by other physical reactions of the equipment responsive to the rolling operation. Obviously, uncontrolled variation in the roll gap precludes controlled production of product to dimensional specifications. This invention provides a technique for measuring the gap between the rolls and for adjusting the rolls to compensate for the variations in rolling so as to permit production of a substantially uniform product during the rolling mill run.

In general, prior to the present invention, the final thickness of many products formed by rolling was not known until it was measured sometime after rolling. When rolling steel, for example, the established practice has been to measure the product thickness by an X-ray gauge after delivery of the product from the mill. This procedure has the obvious shortcoming that knowledge of the product thickness becomes available only after an appreciable length of the product has been rolled. This shortcoming results from the inability to measure the product at the point of rolling and, moreover, because after every adjustment in roll setting, a length of product must be processed through the mill before a gauge check can be made again to evaluate the roll gap. The present invention avoids this and other problems by providing an accurate measurement and control of the roll gap during rolling and at the mill where the deformation of the product takes place.

The invention is particularly advantageous when used in conjunction with continuous casting facilities or any flat product rolling mill. In continuous casting, the precise relationship between roll speed and casting rate is critical and since the mill speed is basically a function of the amount of reduction caused by the rolls and of the speed of the incoming product, it is important to know the roll gap at all times in order that the mill speed may be properly related to the casting speed and to any subsequent rolling equipment. Similarly, in tandem strip mills where it is desirable to maintain minimum tension on the strip between the mill stands, the gap between the mill work rolls and the speed of the rolls must be properly related.

In accordance with the invention, the distance between work rolls of a rolling mill having upper and lower roll assemblies is obtained by measuring the distance between a point on the upper roll assembly and a point on the lower roll assembly and measuring also the distance between the bottom of the upper roll assembly and the said point on the upper roll assembly and the distance between the top of the lower roll assembly and the said point on the lower roll assembly and subtracting the last two measurements from the first measurement to obtain a measurement of the roll gap. In the preferred embodiment, the roll gap is measured by a system including means for obtaining a signal proportional to the distance between a point on the upper roll assembly and a point on the lower roll assembly, means for obtaining a signal proportional to the distance between the bottom of the upper roll assembly and said point on the upper roll assembly, means for obtaining a signal proportional to the distance between the top of the lower roll assembly and said point on the lower roll assembly and means for subtracting the last two signals from the first signal to obtain a signal proportional to the roll gap. Signals other than electrical signals may be employed. The speed of the work rolls and the roll gap may each be adjusted in response to the roll gap measurement.

In the accompanying drawings are illustrated several embodiments of the invention. In the drawings:

FIGURE 1 shows diagrammatically the use of sensing devices to translate mechanical displacement into electrical signals in a 2-high rolling mill during rolling;

FIGURE 1A is a schematic cross section of a preferred type of sensing device;

FIGURE 2 is a block diagram illustrating how the signals received from the sensing devices can be used to make rolling mill adjustments;

FIGURE 3 is a preferred embodiment in detail of a system for use on a 2-high rolling mill;

FIGURE 4 is a schematic side view of a 2-high rolling stand showing the placement of the sensing devices; and FIGURE 5 is a diagram similar to FIGURE 1 illustrating the application of the invention to sense mechanical displacement on a 4-high rolling mill.

The arrangement depicted in FIGURE 1 illustrates the placement of sensor devices on a 2-high rolling stand to permit measurement and control of the spacing between rolls. Although any suitable device for translating mechanical displacement into electrical signals may be employed, the preferred sensors are linear-displacement differential transformers numbered 12, 13 and 14 in FIGURE 1 (such as the linear motion type Model SS–457A manufactured by Collins Corp.). Differential transformers are a type of transducer commercially available in a variety of sensing ranges. In FIGURE 1A, one such device is schematically shown and, as can be seen, includes a cylindrical section 8 and a magnetic core or probe 10. The cylindrical section contains electronic circuitry and transformer so that an input D.C. voltage L1, L2 is converted to an A.C. signal which is impressed upon the primary winding of the transformer. The A.C. voltage across the secondary winding is inverted to a D.C. output L3, L4. The D.C. output is proportional to the position of the probe within the cylindrical element.

Referring back to FIGURE 1, a transducer 12 is positioned so that its cylindrical body is mechanically fixed at the axis of top roll 18 and its movable magnetic probe is mechanically connected by a measurement roll as shown in this and all the figures to the surface of the same roll for measuring and indicating roll radius $a$. Similarly, another transducer 13 is mechanically connected to measure and indicate the radius $b$ of bottom roll 19. A third transducer 14 is located so that its cylindrical body is mechanically fixed to the center of one roll and its movable magnetic probe is mechanically connected to the center of the second roll to measure and indicate the distance $c$ between the center of the top roll and the center of the bottom roll. The net roll spacing $x$ can then be determined by a computer which alegbraically summarizes signals $a$, $b$ and $c$ and determines $x$ according to the equation:

$$x = c - a - b$$

The net reading $x$ is the actual roll gap allowing for roll wear, and roll deflection.

The block diagram in FIGURE 2 illustrates how the sensor signals of the arrangement shown in FIGURE 1 can be used to make necessary adjustments in roll gap to comply with predetermined requirements. As shown, the output signals of the three transducers 12, 13 and 14 can be fed to a computer 15 which may be the General Electric Co. process computer PAC 4000, for a read-out indication of net roll opening $x$ according to the aforementioned equation, and sends a command signal to position regulator 16 to reset the mill rolls by means of conventional screw-down motor and drive 17.

To further illustrate the practice of the invention in detail, reference is made to FIGURE 3 which is a schematic electrical drawing of a typical system utilizing the invention to (1) adjust the roll gap to a given dimension consistent with the product to be processed in a 2-high rolling stand, (2) to read out the roll spacing to assist the operator, and (3) to adjust the peripheral roll speed proportional to roll gap.

In the preferred embodiment of our invention, the desired roll gap is set by manual operation of a rheostat, sending a command signal through a suitable network of amplifiers, resulting in a proportionately larger generator field excitation. The generator field excitation results in a proportional voltage impressed across the armatures of the screw-down motors. Roll movement responsive to the screw-down drives then cause a signal to feed back to the amplifier receiving the rheostat command signal. Thus, for example, as the rolls are moved apart, the feedback signal is sent to the amplifier to offset the signal sent from the rheostat. With a balance in signals (when the rolls are at the predetermined spacing), the output of the amplifier and the corresponding voltage impressed on screw-down motors will decrease to zero. Any deviation in feedback due to roll deflection, roll wear and mill strain alters the feedback signal, which results in the proper generator field excitation, both polarity and magnitude to move the screws up or down as the signal indicates, thereby controlling the roll gap.

Referring to FIGURE 3, there is seen the roll position rheostat 40 referred to above which upon actuating sends a signal to the regulator system consisting of amplifiers 42, 44 and 46 and power amplifier 48. The output of power amplifier 48 provides a corresponding excitation for the generator field which in turn results in a proportional voltage at the generator terminals which is impressed upon the armatures of the screw-down motors 49 to cause top and/or bottom rolls in the mill to move, thereby establishing a desired roll gap. Four transducer assemblies which in the preferred embodiment are differential transformers as discussed above, are mounted with respect to the rolls as best shown in FIGURE 4. Differential transformer assembly 52 is disposed so that its probe responds through linkages to changes in the diameter of roll 50, while its cylindrical section is mounted in a fixed position to roll chuck 54 of roll 50. A second differential transformer assembly 58 is positioned so that its cylindrical element is fixed to the mill housing 31 and its probe is mechanically linked to roll chuck 54 to respond to changes in the axial displacement of the roll. The arrangement of transducer assemblies described with respect to top roll 50 is duplicated with bottom roll 60 so that one differential transformer assembly 62 translates changes in characteristic roll surface, e.g. decreasing diameter due to wear, roll deflection, etc., and differential transformer assembly 64 translates axial displacement of roll 60 into an electrical signal. Upon adjustment of roll spacing by actuating position rheostat 40, a feedback signal from the affected transducer assembly to the position amplifiers 42 and 44 limits roll movement to the desired extent by balancing the command signal.

It will be seen from the above that axial displacement of the rolls 50 or 60 or changes in the diameters of the rolls by deflection, wear, etc., will cause a change in signal output of one of the transducers. For example, a change in roll diameter brought about through wear of the roll surface during rolling causes transducer 52 and/or 62, which senses this change, to send signals responsive to that change by movement of the probe with respect to the cylindrical element of the transducer assembly. These signals are received by mill speed amplifier 70 and position amplifier 42 which algebraically totals the signals and issues a resulting signal to a servo motor 72 and screw-down motor 49 respectively. The signal to the servo motor causes it to make an angular movement and through linkages causes a proportional change in the speed regulator rheostat 74 and in a speed reference rheostat 76. The speed reference rheostat 76 then causes a signal of equal value and opposite polarity to that received by the servo motor to be sent back to the mill speed amplifier 70 thereby stopping the servo at the corresponding position. Simultaneously, the speed regulator rheostat 74 sends a proportional signal through amplifiers 32 and 33 establishing proper ampere turns on the control winding of the amplifiers 78 and 80 resulting in appropriate excitation on the main mill drive generator field for the desired mill motor speed, thereby adjusting the roll speed in proportion to the roll gap. Any deviation in transducer signals will result in a corresponding motor speed change and will change the roll speed.

The signal sent by the transducer to the position amplifiers signifying the need for a roll adjustment to maintain the desired roll gap unbalances the command signal and actuates the circuit causing the screw-down motors to return the rolls to the proper spacing. When the correct roll gap is achieved, the signal fed back by the transducer to the position amplifier will again correctly balance the command signal and the screw-down motor circuit will then be de-energized.

The roll gap in the arrangement shown in FIGURES 3 and 4 will be determined by the same equation given above with respect to FIGURE 1; a difference being, however, that dimension $c$, i.e. the distance between top and bottom roll centers will be, in the FIGURE 3 system, reflected in the voltage outputs of two transducers 58 and 64 in place of the single transducer 14 in FIGURE 1. Thus, the roll gap will be determined by the algebraic summation of the voltage output from transducers 58 and 64 minus the voltage output of each of transducers 52 and 62.

To obtain a read-out indication of roll gap, the signals from the transducers are simultaneously sent to a read-out amplifier 86 which also algebraically totals them and reflects the sum on a suitable digital read-out device 88 which may be a digital voltmeter such as Dynascan III/DVM.

Amplifiers 42, 70 and 86 may be the Westinghouse operational amplifier style 457A673GO1 and amplifier 44 may be style 457A672GO1 by the same company. Similarly, amplifiers 46 and 78 may be Westinghouse preamplifiers style 436A907GO1. Power amplifiers 48 and 80 may be Westinghouse Trinistors type TPA, and amplifiers 32 and 33 may be Westinghouse style 457A674GO1 and 457A675GO1 respectively.

An arrangement incorporating five differential transformers for measuring the roll gap of the work rolls in a 4-high rolling mill is shown in FIGURE 5. The output signals of the five differential transformers are algebraically summarized according to the equation:

$$y = d + e + f - 2(g + h)$$

In FIGURE 5, the cylindrical section of transducer 90 is mechanically fixed to the center of the top back-up roll 91 and its movable magnetic probe is mechanically connected to the center of the top work roll 92. Similarly, the transducer 93 is installed between the bottom back-up roll 94 and the bottom work roll 95. The transducer 96 is located so that its cylindrical section is fixed to the center of bottom work roll 95 and its movable magnetic probe attached to the center of top work roll 192. The transducer 97 is mechanically fixed to the center of top work roll 92 and its movable magnetic probe is mechanically connected to the surface of top back-up roll 91. In a similar fashion, the transducer 98 is installed between the center of bottom work roll 95 and to the surface of bottom back-up roll 94.

When the output signals of the above mentioned five transducers are fed to a computer 99, a signal is available for a read-out indication, main drive speed regulation and roll position regulation (screw-down motors), similar to the 2-high arrangement shown in FIGURE 3.

It will be appreciated that in both embodiments shown in FIGURES 1 and 5 the distance between a point on the upper roll assembly and a point on the lower roll assembly is measured, the distance between the bottom of the upper roll assembly and the point on the upper roll assembly is measured, the distance between the top of the lower roll assembly and the point on the lower roll assembly is measured and the last two measurements are subtracted from the first measurement to obtain the measurement of the roll gap. In the embodiment of FIGURE 1, the first measurement is distance $c$, the second measurement is radius $a$ and the third measurement is radius $b$. In the embodiment of FIGURE 5, the first measurement is the combination of $d$, $e$, and $f$; the second measurement is $2g$ and the third measurement is $2h$. Again, the last two measurements are subtracted from the first to obtain a measurement of the roll gap.

It is apparent from the above description that various changes and modifications may be made without departing from the invention. For example, the mechanical fixing and connecting arrangements for transducers may be accomplished in various ways to meet individual mill conditions. Similarly, although transducers are the preferred means for translating mechanical movement into electrical signals, other means such as potentiometers or servomechanisms may be used. Alternate equipment to perform the functions described hereinabove can be readily selected by those skilled in the art in accordance with individual mill requirements and adaptations of the invention.

We claim:

1. A system for measuring the gap between the work rolls of a rolling mill having upper and lower roll assemblies comprising means for obtaining a signal proportional to the distance between a point on the upper roll assembly and a point on the lower roll assembly, means for obtaining a signal proportional to the distance between the bottom of the upper roll assembly and the said point on the upper roll assembly, means for obtaining a signal proportional to the distance between the top of the lower roll assembly and the said point on the lower roll assembly, and means for subtracting the last two signals from the first signal to obtain a signal proportional to the roll gap.

2. A system for measuring the gap between the work rolls of a rolling mill having upper and lower roll assemblies and for controlling the speed of the work rolls in relation thereto comprising means for obtaining a signal proportional to the distance between a point on the upper roll assembly and a point on the lower roll assembly, means for obtaining a signal proportional to the distance between the bottom of the upper roll assembly and the said point on the upper roll assembly, means for obtaining a signal proportional to the distance between the top of the lower roll assembly and the said point on the lower roll assembly, means for subtracting the last two signals from the first signal to obtain a signal proportional to the roll gap and means responsive to said last named signal for varying the speed of said work rolls proportional to said roll gap.

3. A system for measuring and controlling the gap between the work rolls of a rolling mill having upper and lower roll assemblies comprising means for obtaining a signal proportional to the distance between a point on the upper roll assembly and a point on the lower roll assembly, means for obtaining a signal proportional to the distance between the bottom of the upper roll assembly and the said point on the upper roll assembly, means for obtaining a signal proportional to the distance between the top of the lower roll assembly and the said point on the lower roll assembly, means for subtracting the last two signals from the first signal to obtain a signal proportional to the roll gap and means responsive to said last named signal to adjust said roll gap.

4. A system for measuring the gap between upper and lower work rolls in a rolling mill comprising means for obtaining a signal proportional to the distance between the axes of the work rolls, means for obtaining a signal proportional to the radius of the upper work roll, means for obtaining a signal proportional to the radius of the lower work roll, and means for subtracting the last two signals from the first signal to obtain a signal proportional to the roll gap.

5. A system for measuring the gap between the work rolls in a 4-high rolling mill having an upper back-up roll, an upper work roll, a lower work roll and a lower back-up roll comprising means for obtaining a signal proportional to the distance between the top of the upper back-up roll and the bottom of the lower back-up roll, means for obtaining signals proportional to the combined diameters of the upper back-up and work rolls and the combined diameters of the lower back-up and work rolls and means for subtracting the last named signals from the first signal to obtain a signal proportional to the roll gap.

6. A system for measuring and controlling the gap between the work rolls in a 4-high rolling mill having an upper back-up roll, an upper work roll, a lower work roll and a lower back-up roll comprising means for obtaining a signal proportional to the distance between the top of the upper back-up roll and the bottom of the lower back-up roll, means for obtaining signals proportional to the combined diameters of the upper back-up and work rolls and the combined diameters of the lower back-up and work rolls and means for subtracting the last named signals from the first signal to obtain a signal proportional to the roll gap, and means responsive to said last named signal to adjust the roll gap.

7. A system according to claim 6 in combination with means responsive to the signal proportional to the roll gap for varying the speed of said work rolls in relation to said roll gap.

8. A method of determining the gap between work rolls in a rolling mill having upper and lower roll assemlbies while rolling a product between the work rolls comprising measuring the distance between a point on the upper roll assembly and a point on the lower roll assembly, measuring the distance between the bottom of the upper roll assembly and the said point on the upper roll assembly, measuring the distance between the top of the lower roll assembly and the said point on the lower roller assembly and subtracting the last two measurements from the first measurement to obtain a measurement of the roll gap.

9. A method of determining the gap between upper and lower work rolls in a rolling mill while rolling product therebetween comprising measuring the distance between the axes of the work rolls, measuring the radius of the upper work roll, measuring the radius of the lower work roll and substracting the radii of the upper and lower work rolls from the distance between the axes of the work rolls to obtain a measurement of the roll gap.

10. A method of determining the gap between the work rolls in a 4-high rolling mill having an upper back-up roll, an upper work roll, a lower work roll and a lower back-up roll while rolling product between the work rolls comprising measuring the distance between the top of the upper back-up roll and the bottom of the lower back-up roll, measuring the combined diameters of the upper back-up and work rolls and the combined diameters of the lower back-up and work rolls and subtracting the last named measurement from the first measurement to obtain a measurement of the roll gap.

References Cited

UNITED STATES PATENTS

| | | | |
|---|---|---|---|
| 2,410,283 | 10/1946 | Garr | 72—35 |
| 2,660,214 | 11/1953 | Tinley et al. | 72—35 |
| 2,684,001 | 7/1954 | Wilson | 72—8 |
| 3,177,346 | 4/1965 | Green | 72—8 |
| 3,204,440 | 9/1965 | Thompson | 72—21 |
| 3,208,251 | 9/1965 | Hulls et al. | 72—8 |
| 3,246,496 | 4/1966 | Holben | 72—21 |

CHARLES W. LANHAM, *Primary Examiner.*

A. RUDERMAN, *Assistant Examiner.*